US008560670B2

(12) United States Patent
Stipanovich et al.

(10) Patent No.: US 8,560,670 B2
(45) Date of Patent: Oct. 15, 2013

(54) SYSTEM AND METHOD FOR CHARACTERIZING COMMUNICATION NETWORK CAPACITY IN A GEOGRAPHIC AREA

(75) Inventors: Patricia Stipanovich, Olathe, KS (US); James L. McNaughton, Lenexa, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1186 days.

(21) Appl. No.: 12/012,135

(22) Filed: Jan. 31, 2008

(65) Prior Publication Data
US 2009/0196185 A1 Aug. 6, 2009

(51) Int. Cl.
*G06F 15/173* (2006.01)
(52) U.S. Cl.
USPC .......................... 709/224; 709/220
(58) Field of Classification Search
USPC .......................... 709/238, 224, 220
See application file for complete search history.

(56) References Cited

U.S. PATENT DOCUMENTS

| | | | |
|---|---|---|---|
| 6,185,193 B1 | 2/2001 | Kawakami et al. | |
| 7,251,221 B2 | 7/2007 | Wall et al. | |
| 7,313,534 B2 | 12/2007 | Scheer | |
| 7,333,866 B2 | 2/2008 | Knight | |
| 7,684,321 B2 | 3/2010 | Muirhead et al. | |
| 8,331,250 B2 | 12/2012 | Middleton-Hand et al. | |
| 2002/0007289 A1 | 1/2002 | Malin et al. | |
| 2004/0095907 A1* | 5/2004 | Agee et al. | 370/334 |
| 2007/0067196 A1 | 3/2007 | Usui | |
| 2007/0147264 A1 | 6/2007 | Zolfaghari et al. | |
| 2008/0259815 A1* | 10/2008 | Gorman | 370/254 |
| 2009/0319952 A1 | 12/2009 | Riegel | |
| 2010/0014441 A1 | 1/2010 | Middleton-Hand et al. | |

OTHER PUBLICATIONS

U.S. Appl. No. 12/175,638; Notice of Allowance dated Aug. 22, 2012; 23 pages.
U.S. Appl. No. 12/175,638; Non-Final Rejection dated Sep. 29, 2010; 13 pages.
U.S. Appl. No. 12/175,638; Non-Final Rejection dated Sep. 2, 2011; 21 pages.
U.S. Appl. No. 12/175,638; Non-Final Rejection dated Jun. 2, 2010; 12 pages.
U.S. Appl. No. 12/175,638; Non-Final Rejection dated Mar. 11, 2011; 15 pages.
U.S. Appl. No. 12/175,638; Non-Final Rejection dated Mar. 5, 2010; 11 pages.
U.S. Appl. No. 12/175,638; Final Rejection dated Apr. 11, 2012; 51 pages.
U.S. Appl. No. 12/175,638; Issue Notification dated Nov. 21, 2012; 1 page.

* cited by examiner

*Primary Examiner* — Philip B Tran
(74) *Attorney, Agent, or Firm* — Swanson & Bratschun, L.L.C.

(57) ABSTRACT

A system for characterizing network capacity that stores premise addresses of subscribers and weighted values for the corresponding capacity of the network. Geographic areas containing subscribers are displayed and portions or all of them may be selected by a user. The system generates first descriptors for the selected geographic areas. The system generates an average capacity for the premise addresses for the selected geographic areas and the first descriptors are assigned to corresponding elements of a first matrix based on the weighted value for the calculated average capacity for the premise addresses. The system generates a second matrix representing the relationship of all of the premise addresses and their respective capacity in the selected geographic area based on spatial population descriptors. The system further generates a third matrix using mathematical DCT formulas representing the overall capacity of the network in a geographic area.

18 Claims, 12 Drawing Sheets

| ACCESS NETWORK TECHNOLOGY MATRIX | | | |
|---|---|---|---|
| TECHNOLOGY | NUMBER OF CAPABLE LINES | WEIGHTING (Mbs) | RESULT |
| DIAL UP | NUMBER 1 | A | A X NUMBER 1 |
| ADSL | NUMBER 2 | B | B X NUMBER 2 |
| ADSL2+ | NUMBER 3 | C | C X NUMBER 3 |
| VDSL2 BONDING | NUMBER 4 | D | D X NUMBER 4 |
| VDSL2 | NUMBER 5 | E | E X NUMBER 5 |
| FTTN | NUMBER 6 | F | F X NUMBER 6 |
| FTTC | NUMBER 7 | G | G X NUMBER 7 |
| FTTP | NUMBER 8 | H | H X NUMBER 8 |
|  | TOTAL NUMBER |  | XX |

| 1600 | 1700 | 1400 | 0.784 | 0.784 | 800 | 800 | 750 |
|---|---|---|---|---|---|---|---|
| 1600 | 1600 | 1600 | 0.952 | 0.784 | 700 | 800 | 800 |
| 1700 | 1500 | 0.784 | 0.784 | 0.952 | 800 | 900 | 750 |
| 1500 | 1400 | 0.952 | 0 | 0 | 0.784 | 0 | 800 |
| 0.896 | 1400 | 0.896 | 0 | 0 | 0.784 | 0 | 800 |
| 0.896 | 0.896 | 0.952 | 0 | 0 | 850 | 500 | 500 |
| 0.784 | 0.784 | 0 | 0 | 0.952 | 850 | 400 | 0 |
| 1.008 | 0 | 0 | 0 | 0.784 | 0.784 | 500 | 0 |

FIG. 10

| 14655 | 3172 | 4154 | 1360 | -3847 | -1918 | -13 | -1764 |
|---|---|---|---|---|---|---|---|
| 9679 | 6175 | 2822 | 458 | -1652 | -1076 | 930 | 568 |
| -2538 | -1579 | -1817 | 357 | -1337 | 2985 | 1291 | 2016 |
| -183 | -1736 | -1718 | -1496 | -1602 | -781 | 1536 | -160 |
| -1200 | 2103 | 40 | -2190 | 1298 | -1765 | -1733 | 162 |
| -78 | 277 | 685 | 2394 | 895 | 588 | 470 | -801 |
| -108 | -1699 | 870 | 1581 | 421 | 935 | -573 | -441 |
| -204 | -556 | -711 | 245 | -822 | -972 | -1458 | -1071 |

SYSTEM AND METHOD FOR CHARACTERIZING COMMUNICATION NETWORK CAPACITY IN A GEOGRAPHIC AREA

FIELD OF THE INVENTION

The field of the invention relates in general to the field of electronic information distribution, in particular, to a system and method for characterizing telecommunication capacity in a geographic area.

BACKGROUND OF THE INVENTION

Various means have been used to characterize various individual network technologies as used in communications networks. Copper twisted pairs as used in the world's telephone networks can be described in terms of their capabilities as used with Digital Subscriber Line ("DSL") equipment as 1.5 megabits per second or 3.0 megabits per second and so on. These capabilities are based upon the length of the copper line and the particular DSL technology that is used. Hybrid Fiber Coaxial ("HFC") cable networks can be characterized in terms of their overall analog bandwidth as 750 MHz, etc. Optical fiber networks can be described in terms of their digital capability as 622 megabits per second or 2.5 gigabits per second, etc. Optical fiber cables have large capacities and are being installed in networks to augment or replace lower capacity networks. Other technologies such as fiber to the node and fiber to the curb can also be characterized in a similar manner.

In one example, U.S. Pat. No. 6,625,255 describes a method and apparatus for communications loop characterization based on a sampling of a reference loop to predict the overall capability of the rest of the copper loops in a cable binder group. This method predicts the capability of that particular cable, but it does not predict the overall capability of the geographically bound Carrier Serving Area ("CSA") or other local network containing that cable. Various test sets can also characterize individual link segment speeds and capabilities, but these measurements take a considerable amount of time and effort to obtain and these measurements also fail to characterize the total capabilities of the communications networks in a particular geographic area.

Various network stimulation packages also produce overall network quality or capability measurements. Nevertheless, these packages are meant to be applied to specific communication networks, and are not geared towards computing the capability of a geographic area with potentially many different communications technologies.

Critical decisions regarding investments in various technologies are being made by network operators today based upon their assessment of the needs of their customers with respect to service speeds. For instance, a determination is made that a copper network segment must be replaced with optical fiber, but operators must figure our how this technology fits in with the overall network capability in this area or CSA, for example. They may further have a need to determine whether it be better to concentrate new optical fiber network segments together in one location or another location. Network operators today need a means to characterize their networks in terms of their overall capabilities or their capabilities of their network in particular cities, municipalities, wire centers, CSA's or other determinable geographically bound network areas quickly and effectively. This information would be used to more adequately and realistically describe these areas such that quicker, less costly, and better quality network investments can be made.

In addition, all of the telecommunications companies are interested in upgrading their capacity of their networks. In doing this, it is useful to be able to characterize and determine the existing capacity of their networks. For example, some telecommunications companies may want to compare their network capacity with competitors for presenting to their shareholders to show that they are competitive. Also, this information may be useful for decision makers at these companies to know where they stand relative to the industry. Further, some states may require a telecommunications companies to provide a certain capacity within their state, thus it would be useful to be able to quickly determine, characterize, and present these capacity determinations to the state to show compliance with their requirements. One difficulty in determining these overall capacity determinations for a particular geographic area, or sub-geographic area, is that capacity may exist in different magnitudes within a particular geographic area. Additionally, the density of service units, such as houses and buildings, may fluctuate greatly within a particular geographic area. Thus, the telecommunications company may provide a certain high capacity at certain parts of a geographic area servicing a certain number of units and a lower capacity in other parts of a geographic area servicing a different number of units. It may further provide capacity between these to yet another number of units. All of this makes quickly determining network capacity for a telecommunications company difficult. Add to this the fact that many times it is desirable to request a network capacity determination for certain smaller geographic areas within a larger geographic area and the determination may be equally difficult to achieve.

SUMMARY

In one embodiment, the present system and method for characterizing communication network capacity in a geographic area ("system for characterizing network capacity") provides for a method for automatically characterizing the overall network capacity or capability of an arbitrary communications network in a geographic area using a unique identifier. The method is based upon a weighted average or Discrete Cosine Transform ("DCT") of a matrix of network segment values and technology characteristics. Each network segment descriptor is an input to a matrix that is used to calculate an overall network capacity descriptor that is characteristic of the overall network in a wire center area or CSA or other network geographic area. The present system for characterizing network capacity provides a realistic assessment of the actual communications network capability and constraints such that decisions regarding network builds can be made more quickly and precisely. The present system for characterizing network capacity also provides for an opportunity to assess the overall geographic extent of the network capability such that automated optimization scenarios can be constructed and reviewed.

Descriptors for each geographic area may be used as an input to a matrix that may be used to calculate a further descriptor for the area using the DCT of the matrix. The DCT of the matrix returns a further matrix consisting of numbers describing a base matrix in terms of the spatial population and frequencies of the respective first matrix. These numbers would be added together or manipulated in another manner to produce an overall descriptor of the potential capability of this area. Each area such as this can then be compared with all of the other areas to rank order the value of each area.

The DCT of the area is used to obtain characteristics of the area such as the spatial population of certain high bandwidth values or other details of the area not available using simple mathematical operations. In another embodiment, the present system for characterizing network capacity provides a graphical representation of a network communications capacity at an individual house, neighborhood level, or larger area by presenting a matrix of weighted or transformed capacity elements represented by spatial frequency parameters. These parameters are based on a DCT of the weighted capacity values based on the underlying network communications technology deployed in the geographic area under examination.

The graphical presentation indicates the overall capacity and strategic placement of various network communications technologies, the potential for remediation of various capacity issues present, and the capacity gradients that may be present. In addition, by filtering the higher frequency information from the matrix, a compressed view of the network can be obtained.

The high frequency information, for instance, would contain spatial frequency components related to original parameter values that would occur in close proximity. Large component values that occur broadly across an area would usually be of more interest. This is similar to obtaining a compressed view of an image where high frequency components are ignored and only the lower frequency parameters are used in further operations.

In one embodiment, the system for characterizing network capacity includes a computer implemented system for characterizing capacity of a telecommunications network includes a server including at least one storage device for storing at least one premise address for at least one subscriber of the telecommunications network and a weighted value for the corresponding capacity of the telecommunications network to the at least one premise address; a display for displaying maps of geographic areas covering the at least one premise address; an input device for selecting a first geographic area containing one or more of the at least one premise address on the displayed maps of geographic areas; and a processor for calculating a first descriptor for the selected first geographic area, the processor configured to: determine the total number of the at least one premise address in the selected first geographic area and the weighted value for the corresponding capacity to the at least one premise address in the selected first geographic area; calculate an average capacity for the at least one premise address for the selected first geographic area; and assign the first descriptor to a first element of a first matrix based on the weighted value for the calculated average capacity for the at least one premise address.

In another embodiment, the system for characterizing network capacity includes a method for characterizing capacity of a telecommunications network including storing at least one premise address for at least one subscriber of the telecommunications network and a weighted value for the corresponding capacity of the telecommunications network to the at least one premise address; displaying maps of geographic areas covering the at least one premise address; selecting a first geographic area containing one or more of the at least one premise address on the displayed maps of geographic areas; determining the number of the at least one premise address in the first geographic area and the weighted value for the corresponding capacity to each of the number of at least one premise address in the first geographic area; calculating an average network capacity for the first geographic area; producing a first matrix that corresponds substantially to the first geographic area, each element of the first matrix representing a smaller portion of the first geographic area; and assigning a descriptor to each element of the first matrix based on a calculated average capacity for the number of the at least one premise address in each of the smaller portion of the first geographic area.

The method may further include selecting a capacity threshold for the at least one premise address in the smaller portion of the first geographic area. Preferably, the assigning a descriptor further includes assigning a first descriptor to each element of the first matrix when the calculated average capacity is less than the capacity threshold and a second descriptor to each element of the first matrix when the calculated average capacity is equal to or greater than the capacity threshold. The method may further include the descriptor is one of a "1" or a "0." Preferably, the method further includes producing a second matrix that corresponds substantially to the first matrix, each element of the second matrix corresponding to a similar element in the first matrix. Preferably, the method further includes producing a second matrix that corresponds substantially to the first matrix, each element of the second matrix corresponding to a similar element in the first matrix; and assigning a spatial population descriptor to each element of the second matrix based on the spatial population of the values contained in the first matrix.

The method may further include assigning a higher spatial population descriptor to each element of the second matrix when a higher frequency of "1" values are contained in adjacent corresponding elements of the first matrix. Preferably, the method may further include assigning a lower spatial population descriptor to each element of the second matrix when a higher frequency of "0" values are contained in adjacent corresponding elements of the first matrix. Preferably, the method further includes producing a third matrix that uses a mathematical formula for transforming the values of the elements in the second matrix to transformed values of the elements in the third matrix that represents the overall network capacity of the telecommunications network. Preferably, the mathematical formula is one of a Fourier-transform formula and a discrete cosine transformation formula. The method may also include displaying a three-dimensional indicia corresponding in magnitude to each of the transformed values in the elements of the third matrix. Additionally, the method may further include selecting a transformed value threshold for the transformed values; and displaying those transformed values that are equal to or greater than the transformed value threshold.

BRIEF DESCRIPTION OF THE DRAWINGS

Illustrative embodiments of the present invention are described in detail below with reference to the attached drawing figures, which are incorporated by reference herein and wherein:

FIG. 7 illustrates an exemplary GUI of a database including weighted values for corresponding capacities provided in a particular geographic area according to an embodiment of the present invention;

FIG. 8 illustrates an exemplary matrix containing descriptors from application of a threshold to the descriptors of the system for characterizing network capacity according to an embodiment of the present invention;

FIG. 9 illustrates another exemplary matrix containing values based on the descriptors of FIG. 8 of the system for characterizing network capacity according to an embodiment of the present invention;

FIG. 10 illustrates another exemplary matrix containing transformed values based on the descriptors of FIG. 9 of the system for characterizing network capacity according to an embodiment of the present invention;

DETAILED DESCRIPTION OF THE DRAWINGS

Figure 1:
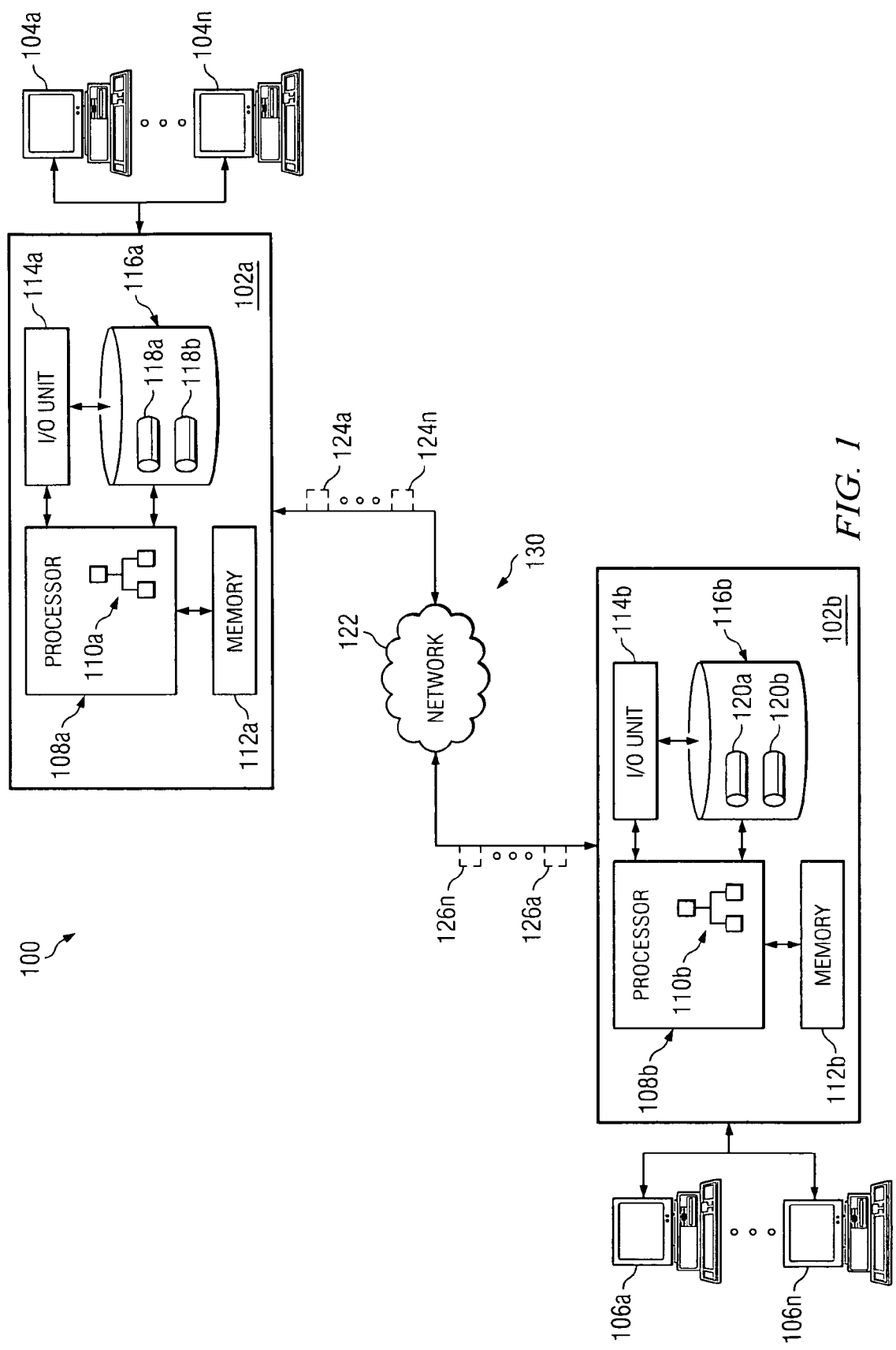
FIG. 1 illustrates a block diagram of an exemplary network of computers in a system for characterizing network capacity according to an embodiment of the present invention.

In the drawings, like or similar elements are designated with identical reference numerals throughout the several views and figures thereof, and various depicted elements may not be drawn necessarily to scale. FIG. 1 illustrates an illustrative embodiment of a typical computer network system 130 that may be part of the system for characterizing network capacity 100. The computer network system 130 may include any number of personal computers 104a-104n and 106a-106n that may or may not operate over a network 122. The computer network system 130 may utilize personal computers 104a-104n and 106a-106n (personal computers 104a-104n and 106a-106n collectively computers 104-106) and servers 102a-102b (102a-102b collectively 102). The servers 102a and 102b typically may host the personal computers 104a-104n and 106a-106n, respectively, utilized by users of the system for characterizing network capacity 100.

The servers 102 may include processors 108a-108b (processors 108a-108b collectively 108) that execute software 110a-110b (110a-110b collectively 110). The processors 108 may be in communication with memory 112a-112b (112a-112b collectively 112), input/output (I/O) units 114a-114b (114a-114b collectively 114), and storage units 116a-116b (116a-116b collectively 116). The storage units 116a and 116b may store databases or data repositories 118a-118b and 120a-120b (118a-118b and 120a-120b collectively 118 and 120), respectively, thereon. The software 110 may include instructions for execution by the processors 108 for characterizing capacity information in accordance with the principles of the present system for characterizing network capacity 100. In one embodiment, the software 110 is composed of a mathematical applications and database applications for system for characterizing network capacity as further described herein. The servers 102 may be physically located or utilized by any location as further described herein.

Each of the servers 102 may communicate via the network 122. The network 122 may be the Internet, intranet, WANs, LANs, or other communication systems capable of communicating information between computing devices. The server 102a may communicate data packets 124a-124n containing information related to any of the computer and networks to another server 102b through data packets 126a-126n, as understood in the art. Similarly, the server 102a may communicate information to the server 102b via data packets 124a-124n and 126a-126n, respectively, via the network 122. In addition, network 122 may be a communications network a computer network an internet network or a combination of them, and the like.

In operation, the servers 102 may execute the software 110 to enable any locations of the present system for characterizing network capacity 100 to utilize their personal computers 104, for example, either directly with the servers 102 or indirectly via the network 122. The personal computers 104 and 106 enable the users of the present system for characterizing network capacity 100 to interface with the software 110 to display maps, information, data, links, and the like. Personal computers 104 and 106 may also include other peripherals, such as keyboards, displays, microphones, mouse and the like. In addition to the features described herein, another illustrative feature of software 110 is that it enables users to post, view, and download information relating to network capacity of interest to certain other subgroups, groups, and users. As described herein, the information related to the present system may include subscriber data, addresses, telephone numbers, FAX numbers, e-mail addresses, hyperlinks, links, stored documents, stored graphical images, stored data, data capacity speeds, and the like.

In one embodiment, the software 110 is run on servers 102 and/or personal computers 104 and 106 to display text, graphics, and menus on the monitor of the personal computers 104 and 106. Any of the applications described herein may generally reside on the local drive or memory of the personal computers 104 and 106 and/or memories 112 of servers 102. The storage units 116 may store databases or data repositories thereon. The software 110 may include instructions for execution by the processors 108 for characterizing network capacity and the like. In one embodiment, the software 110 is composed of instructions for selecting geographical areas; executing mathematical formulas, expressions, algorithms, integrals, derivatives, and the like; selecting geographical areas, displaying characterization outputs; displaying GUI options menus and submenus; and displaying textual and graphical outputs to a user as further described herein.

Figure 2:
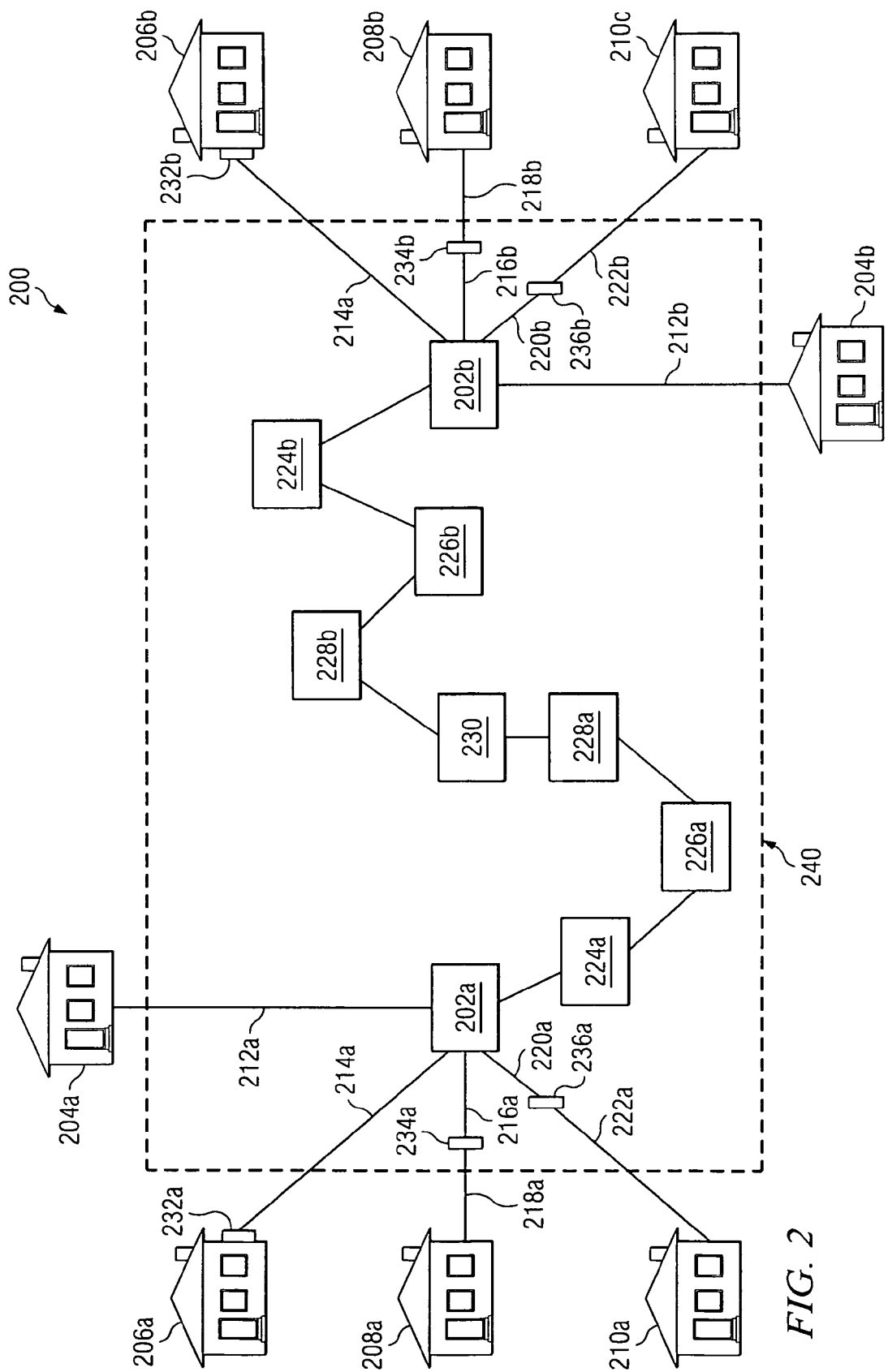
FIG. 2 illustrates a block diagram of an exemplary telecommunications network in a system for characterizing network capacity according to an embodiment of the present invention.

FIG. 2 illustrates an illustrative embodiment of a telecommunications network 200 of a telecommunications service provider 240 (FIG. 2) that may use the system for characterizing network capacity 100. In this embodiment, many different levels of switches and operations are shown, although the present system for characterizing network capacity 100 may use one of more of the switches and operations. In addition, the switches and operations shown may further include additional operations and functionality for providing telecommunication capacity to users as would be known to one skilled in the art. Further, the telecommunications network 200 may include any type of telecommunications service, such as public switched telephone network ("PSTN") services, voice over Internet Protocol ("VoIP") services, broadband telecommunications services, narrowband telecommunications services, integrated services digital network ("ISDN") services, digital subscriber line ("DSL") services, cable services, analog telephone services, digital telephone services, private branch exchange ("PBX") services, and the like.

In general, the telecommunications network 200 of the telecommunications service provider 240 may include one or more operations or switch levels as shown in FIG. 2, such as a regional center ("RC") 230 or Class 1 switch; sectional center ("SC") 228a-228b (228a-228b collectively 228) or Class 2 switch; primary center ("PC") 226a-226b (226a-226b collectively 226) or Class 3 switch; toll center ("TC") 224a-224b (224a-224b collectively 224) or Class 4 switch; and central office ("CO") 202a-202b (202a-202b collectively 202). These switch levels may be interconnected with each other as shown by wires and cables as is commonly known to one skilled in the art. In general, the RC 230 may be involved in setting up voice, video, and data connections between the other switches, centers, and offices. The SC 228 may be involved with connecting major TC 224 within a geographic area to provide interstate or interprovincial connections. The PC 226 may generally connect various TC 224 in outlying geographic areas to the PC 226. The TC 224 may be used to connect two or more CO 202 that are not directly connected together. The CO 202 typically provides voice, video, and data service directly to subscribers 204a-204b, 206a-206b, 208a-208b, and 210a-210b as further described herein. Any number of these switches, centers, and offices may be used in the present system for characterizing network capacity 100. Any of these entities may comprise the telecommunications service provider is generally designated 240.

The CO 202 may provide voice, video, and data services at different capacity or capability to the subscribers 204a-204b, 206a-206b, 208a-208b, and 210a-210b. For example, the CO 202 may provide a lower capacity service to subscribers 204a-204b (204a-204b collectively 204) via connection 212a-212b (212a-212b collectively 212). In one aspect, connection 212 may be a dial-up connection as is know to those skilled in the art. In another example, the CO 202 may provide voice, video, and data services at a different capacity to the subscribers 206a-206b (206a-206b collectively 206) via connection 214a-214b (214a-214b collectively 214). In this example, the connection 214 may be a fiber to the premise (FTTP) connection. The connection 214 may connect to an optical network unit ("ONU") or optical network terminals ("ONT") 232a-232b (232a-232b collectively 232) located at the premises that provides connections to twisted copper pair or coaxial cable runs into the subscriber's 206 premises.

In another example, the CO 202 may provide voice, video, and data services at a different capacity to subscribers 208a-208b (208a-208b collectively 208) via connections 216a-216b (216a-216b collectively 216) and 218a-218b (218a-218b collectively 218), respectively. In this example, the connection 216 may be a optical fiber connection, while the connection 218 may be a twisted copper pair connection or coaxial cable connection; the combination may be known as fiber to the curb ("FTTC"). These connections may be joined by a ONU 234a-234b (234a-234b collectively 234) that is located a greater distance from the subscriber's 208 premises than the ONU 232. In another example, the CO 202 may provide voice, video, and data services at a different capacity to subscribers 210a-210b (210a-210b collectively 210) via connections 220a-220b (220a-220b collectively 220) and 222a-222b (222a-222b collectively 222), respectively. In this example, the connection 220 may be a optical fiber connection, while the connection 222 may be a twisted copper pair connection or coaxial cable connection; the combination may be known as fiber to the node ("FTTN"). These connections may be joined by a ONU 236a-236b (236a-236b collectively 236) that is located a greater distance from the subscriber's 208 premises than the ONU 234.

The connections 214, 216, and 220 may be a direct fiber connection where each optical fiber connection leaving the CO 202 goes exactly to one subscriber's 206 premises. In another example, the fiber connections 214, 216, and 220 may be a shared fiber connection where each optical fiber connection leaving the CO 202 is split into individual subscriber-specific fiber connections. Such splits may be active optical networks or passive optical network connections as known to those skilled in the art.

Other connections may be used with the system for characterizing network capacity 100, such as HFC, asymmetric digital subscriber line ("ADSL"), asymmetric digital subscriber line 2 ("ADSL2"), ADSL2+, very high digital subscriber line ("VDSL"), VDSL2, VDSL2+, and VDSL2 bonding. Generally, each connection 212, 214, 216, 218, 220, and 222 has a corresponding connection and/or transmission speed, typically measured as some size of voice, video, or data per a time unit, such as kilobits per second ("Kbps"), megabits per second ("Mbps"), and gigabits per second ("Gbps"), and the like, that is provided to the subscribers 204, 206, 208, and 210. In addition to those subscribers 204, 206, 208, and 210 and connections 212, 214, 216, 218, 220, and 222 described herein, other types, sizes, capacities, and the like of subscribers 204, 206, 208, and 210 and connections 212, 214, 216, 218, 220, and 222 are also contemplated with the present system for characterizing network capacity system for characterizing network capacity 100.

For example, copper twisted pairs as used in today's telephone networks may have a capacity of approximately 56 Kbps. While, DSL may have a typical capacity of from about 1.5 Mps to approximately 3.0 Mbps. HFC may have a typical analog bandwidth of approximately 750 megahertz. Optical fiber networks may have a capacity of from about 622 Mbps to about 2.5 Gbps.

Figure 3:
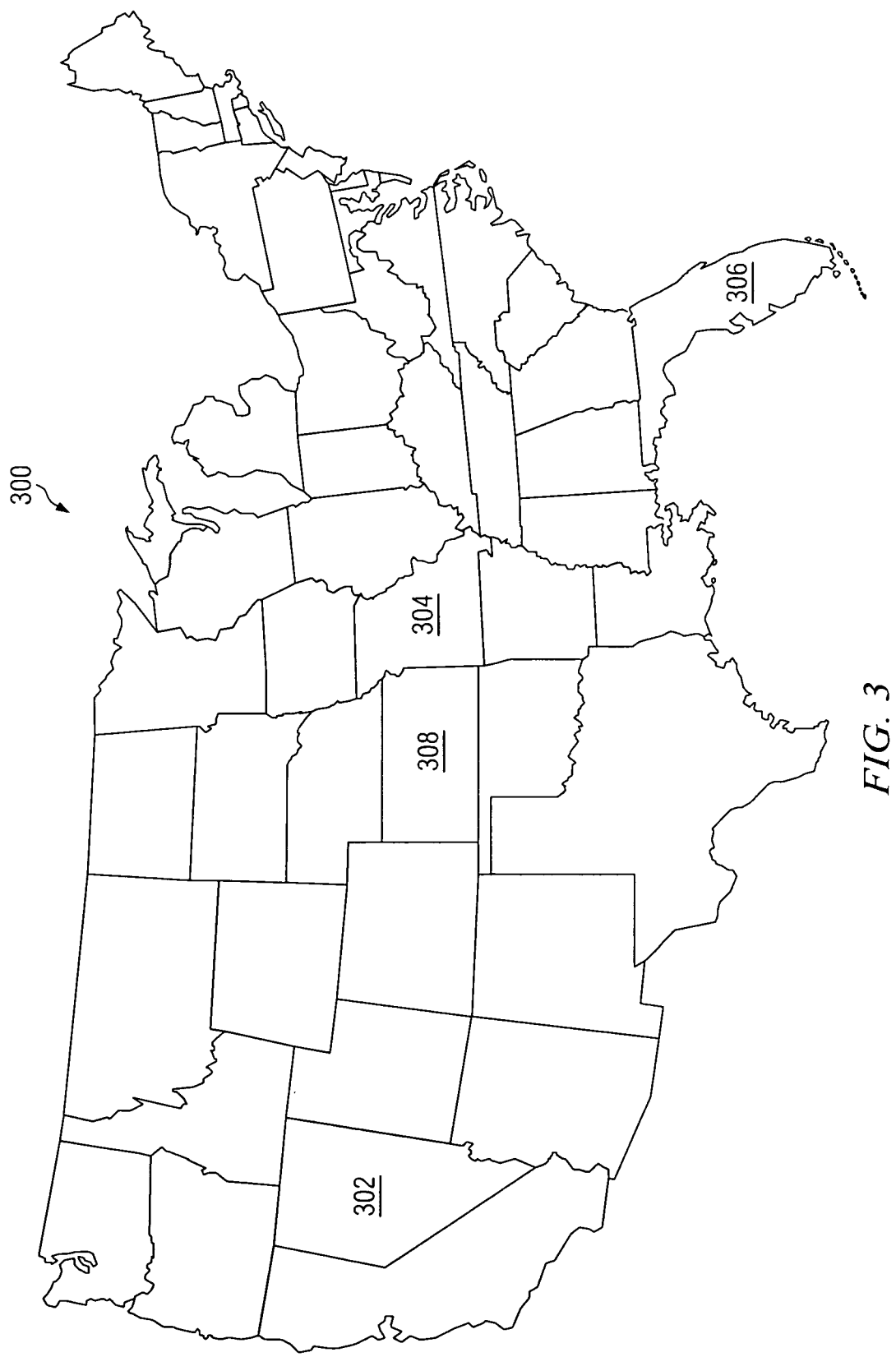
FIG. 3 illustrates an exemplary screenshot of a GUI of a geographic area that may include subscribers in the system for characterizing network capacity according to an embodiment of the present invention.

FIG. 3 illustrates an embodiment of a screenshot of a GUI of a geographic area 300 that may include subscribers of a telecommunications service provider 240. For example, geographic area 300 may include particular states, such as Nevada 302, Missouri 304, Florida 306, and Kansas 308, where subscribers reside of telecommunications service provider 240. The exemplary geographic area 300 may be displayed to one or more of the personal computers 104 and 106 for displaying and selecting other geographic areas contained within the geographic area 300 by a user. The selected geographic area 300 may be controlled by personal computers 104 and 106 utilizing storage units 116 storing subscribers of the telecommunications service provider 240 or it may be selected by a user using the peripherals of the personal computers 104 and 106. Although, some states are noted in the geographic area 300, any or all of the states of the geographic area 300 may be selected and/or displayed to a user of the system for characterizing network capacity 100. In addition, any other geographic area, such as maps of other continents and countries may be selected and displayed as well. Thus, the geographic area 300 is being shown as a non-limiting exemplary geographic area.

Figure 4:
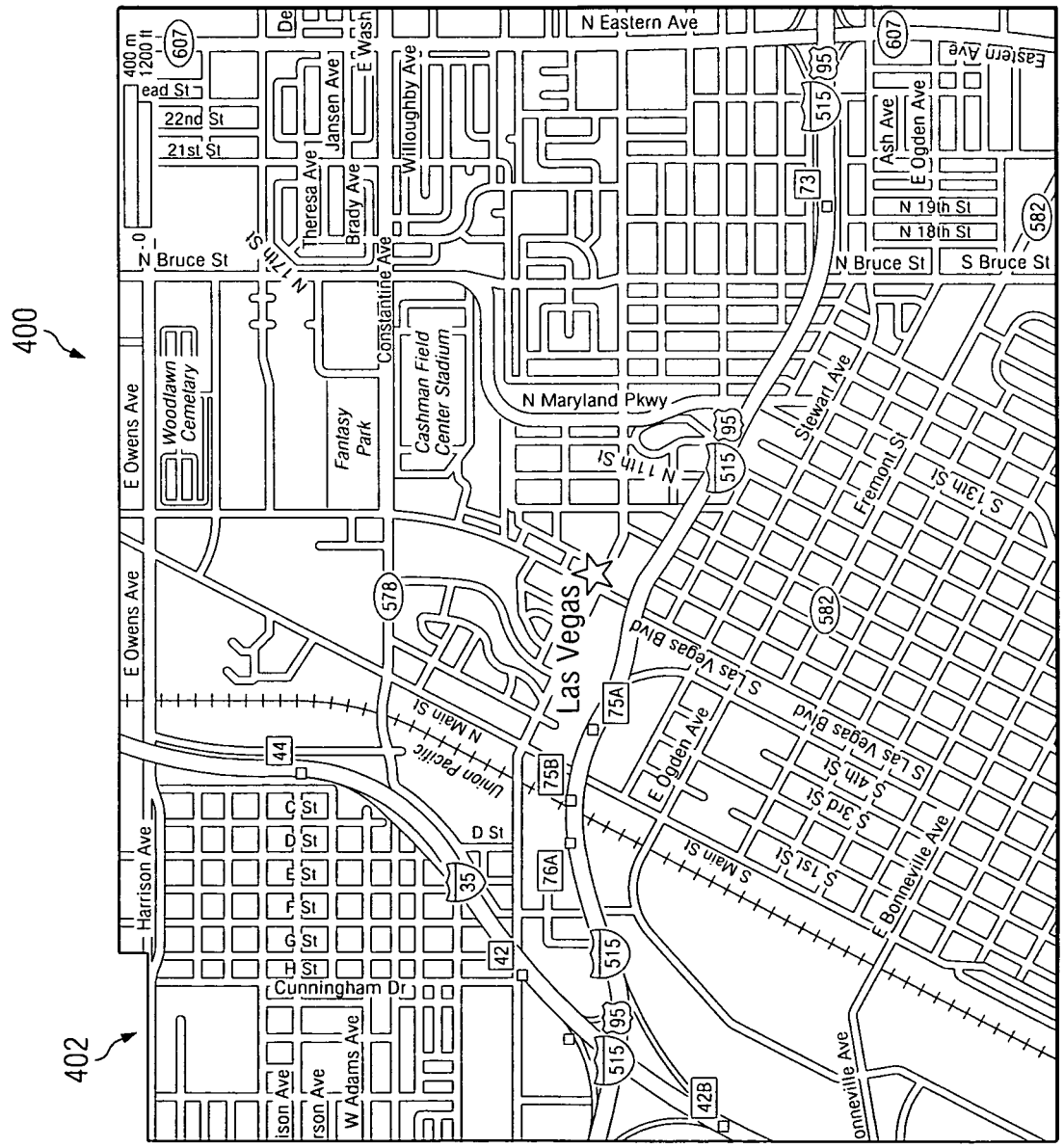
FIG. 4 illustrates an exemplary screenshot of a GUI of a geographic area that may include subscribers in a system for characterizing network capacity according to another embodiment of the present invention.

FIG. 4 illustrates an embodiment of a screenshot of a GUI of a geographic area 400 that may include subscribers of a telecommunications service provider 240. For example, geographic area 400 may include particular cities, such as Las Vegas 402 where subscribers may or may not be provided telecommunications service by a provider that may use the system for characterizing network capacity system 100. The exemplary geographic area 400 may be displayed to one or more of the personal computers 104 and 106 for displaying and selecting other geographic areas contained within the geographic area 400 by a user. The geographic area 400 may be displayed to a user of the system for characterizing network capacity 100 by highlighting the particular state, Nevada 302 on the geographic area 300 and then selecting any of the cities within the state that may or may not have subscribers, such as Las Vegas 402. The selected area of Las Vegas 402 may be controlled by personal computers 104 and 106 utilizing storage units 116 storing subscribers of the telecommunications service provider 240 or it may be selected by a user using the peripherals of the personal computers 104 and 106. In this embodiment, the selected and displayed geographic area 400 of Las Vegas 402 may contain areas of the city that have the same or different capacity of services provided by the telecommunications service provider 240 as will be discussed further below. In addition, any other geographic area, such as cities of other states and counties may be selected and displayed as well. Thus, the geographic area 400 is being shown as a non-limiting exemplary geographic area.

Figure 5:
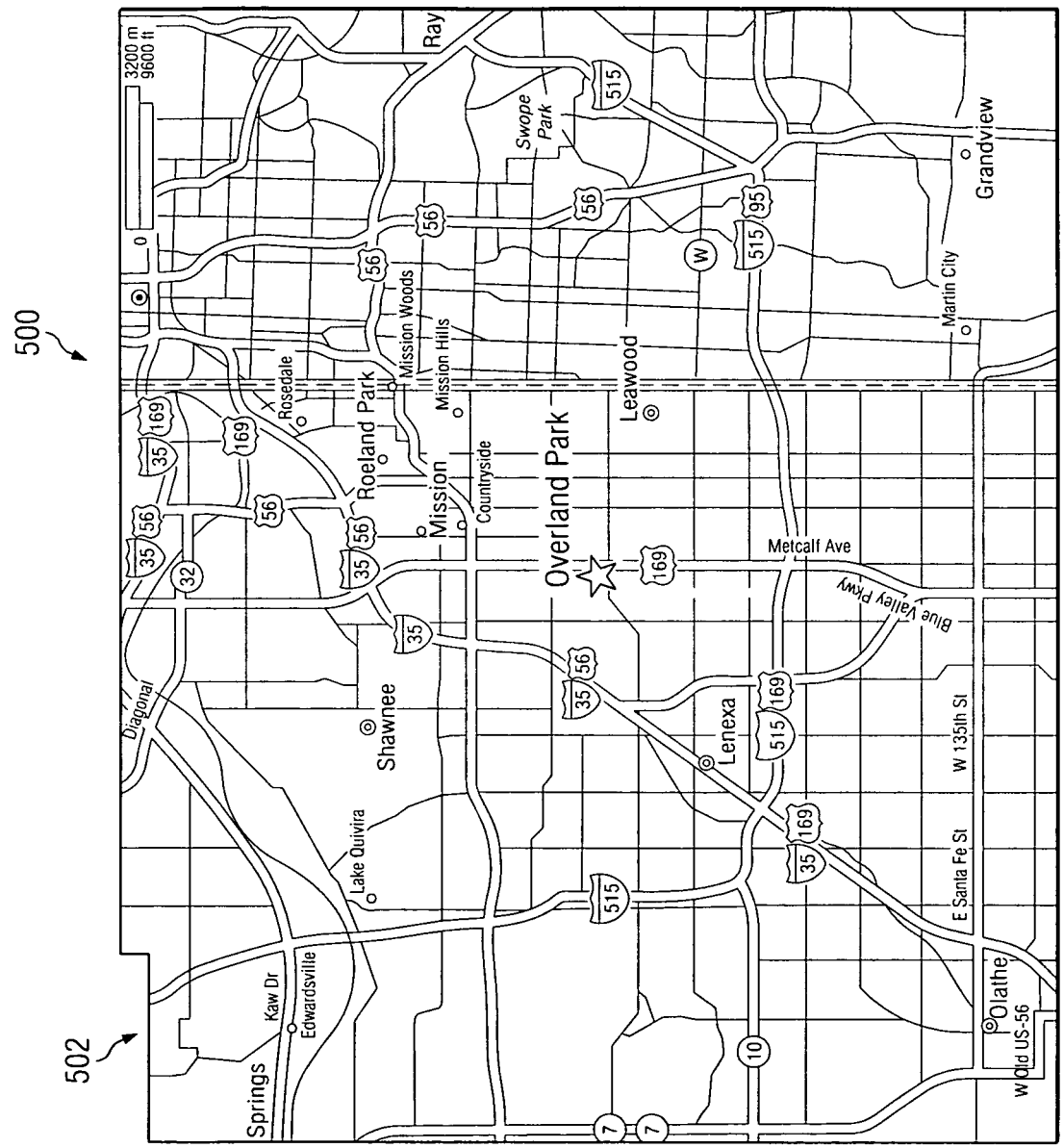
FIG. 5 illustrates an exemplary screenshot of a GUI of a geographic area that may include subscribers in a system for characterizing network capacity according to another embodiment of the present invention.

FIG. 5 illustrates an embodiment of a screenshot of a GUI of a geographic area 500 that may include subscribers of a telecommunications service provider 240. For example, geographic area 500 may include other particular cities, such as Overland Park 502, where subscribers may or may not be provided telecommunications service by a provider that may use the system for characterizing network capacity system 100. The exemplary geographic area 500 may be displayed to one or more of the personal computers 104 and 106 for displaying and selecting other geographic areas contained within the geographic area 500 by a user. The geographic area 500 may be displayed to a user of the system for characterizing network capacity 100 by highlighting the particular state, Kansas 308, on the geographic area 300 and then selecting any of the cities within the state that may or may not have subscribers, such as Overland Park 502. The selected area of Overland Park 502 may be controlled by personal computers 104 and 106 utilizing storage units 116 storing subscribers of the telecommunications service provider 240 or it may be selected by a user using the peripherals of the personal computers 104 and 106. In this embodiment, the selected and displayed geographic area 500 of Overland Park 502 may contain areas of the city that have the same or different capacity of services provided by the telecommunications service provider 240 as will be discussed further below. In addition, any other geographic area, such as maps of other cities and counties may be selected and displayed as well. Thus, the geographic area 500 is being shown as a non-limiting exemplary geographic area.

Figure 6:
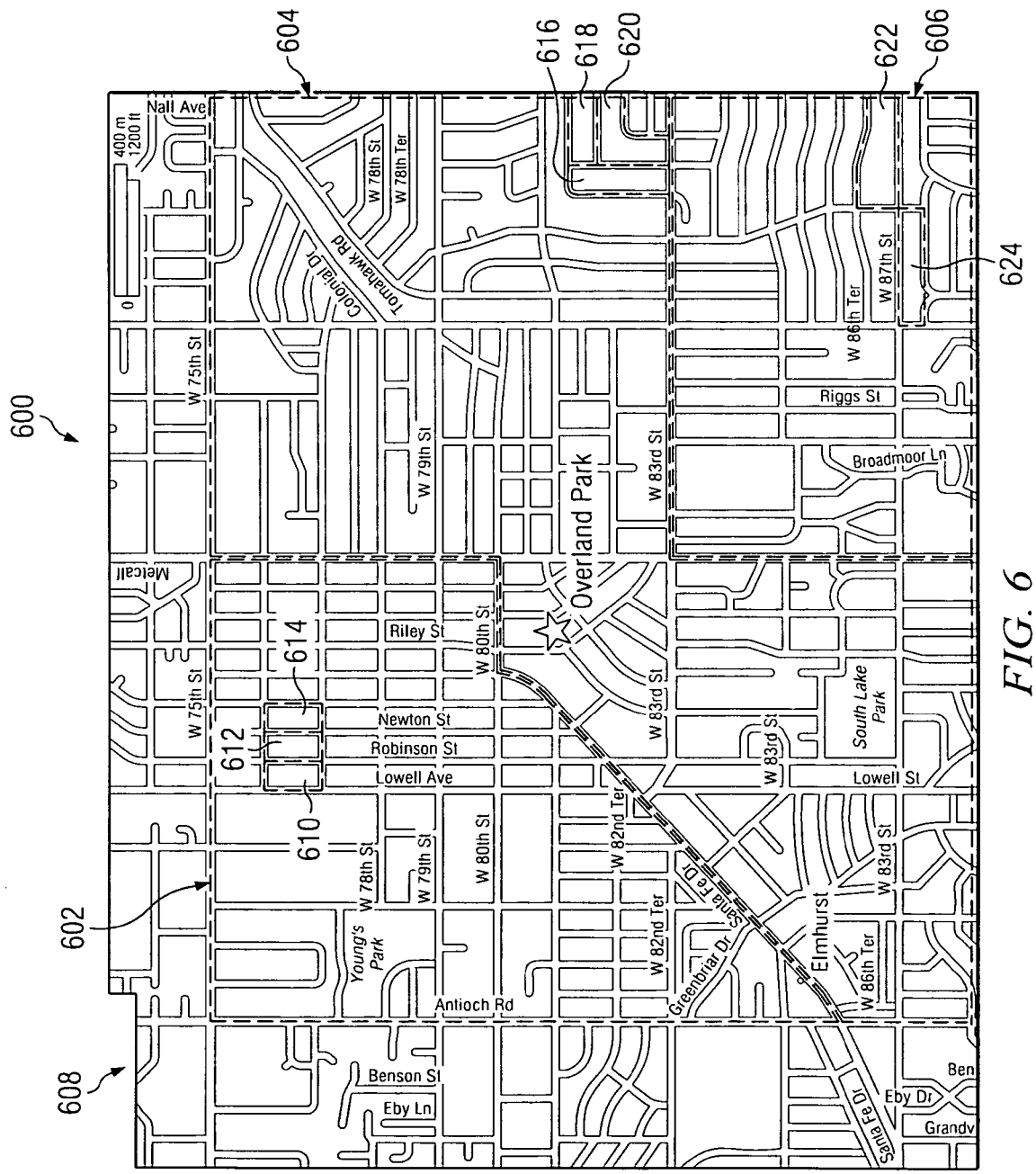
FIG. 6 illustrates an exemplary screenshot of a GUI of a geographic area that has portions of the area selected for capacity determination according to an embodiment of the present invention.

FIG. 6 illustrates an embodiment of a screenshot of a GUI of a geographic area 600 that includes selected and displayed portions of a particular geographic area, such as Overland Park 608, which may include subscribers of the telecommunications service provider 240. In this example, geographic area 600, Overland Park 608, has been selected and displayed that also include portions of the geographic area 600 that have also been highlighted, such as geographic areas 602, 604, and 606 where subscribers may or may not be provided telecommunications service by the telecommunications service provider 240. The exemplary geographic area 600 may be displayed to one or more of the personal computers 104 and 106 for displaying and selecting other geographic areas contained within the geographic area 600 by a user, such as geographic areas 602, 604, and 606. The selected geographic areas 602, 604, and 606 may be controlled by personal computers 104 and 106 utilizing storage units 116 storing subscribers of the telecommunications service provider 240 or it may be selected by a user using the peripherals of the personal computers 104 and 106. In addition to those selected geographic areas 602, 604, and 606, any other geographic area be selected and displayed as well. Thus, the geographic area 600 is being shown as a non-limiting exemplary geographic area.

Geographic area 602 may be a selected area where subscribers of a telecommunications service provider 240 may reside and be provided service through one or more connections. For example, geographic area 602 may represent a geographic area where a telecommunications service provider 240 provides FTTP service to the subscribers who reside in the geographic area 602. Likewise, geographic area 604 may be a selected area where subscribers of a telecommunications service provider 240 may reside and be provided service through one or more connections. For example, geographic area 604 may represent a geographic area where a telecommunications service provider 240 provides copper twisted pair service to the subscribers who reside in the geographic area 604. Similarly, geographic area 606 may be a selected area where subscribers of a telecommunications service provider 240 may reside and be provided service through one or more connections. For example, geographic area 606 may represent a geographic area where a telecommunications service provider 240 provides FTTC service to the subscribers who reside in the geographic area 606. In one embodiment, any geographic area may be selected by a user of the system for characterizing network capacity 100. In another example, the geographic areas selected may be neighborhoods 610-624 of a geographic area. In yet another example, geographic areas 602, 604, and 606 and neighborhoods 610-624 may be selected together. The neighborhoods 610-624 may include any number of premises each, for example 50 premises.

Thousands of these connections may be serviced by or terminated in a CO 202. In one embodiment, these connections 212, 214, 216, 218, 220, and 222 to subscribers 204, 206, 208, and 210 may be divided into a number of geographically diverse routes, each of which may be subject to differing environmental factors, such as electromagnetic interference. Each of the geographically diverse routes may further be divided into CSA groups, and connections or loops within a binder group may be cross-connected at a binder post to provide service to a particular area.

FIG. 7 illustrates an illustrative embodiment of a GUI 700 of a database including weighted values that correspond to different capacity technologies for characterizing network capacity of a selected geographic area. In this embodiment, GUI 700 may include a "technology" field 702 that contains the different capacities provided to a telecommunications service provider's 240 subscribers 204, 206, 208, and 210. In one aspect, technology field 702 may include those technologies that are provided by the telecommunications service provider 240, such as such as dial-up 710, ADSL 712, ADSL2+ 714, VDSL2 bonding 716, VDSL2 718, FTTN 720, FTTC 722, and FTTP 724. Other types of technologies may be used in this field as well. The GUI 700 may also include a "number of capable lines" field 704 that may contain the number of connections, loops, lines, and the like that are associated with each of the different capacities in the technology field 702. In one embodiment, the values contained in the number of capable lines field 704 may be summed and inserted in the "total number" field 726. The GUI 700 may further include a "weighting" field 706 that contains a weighting value associated with each of the different capacities in the technology field 702. One exemplary unit for the weighting field 706 may be bitrate, such as Mbps, Kbps, and Gbps, for example. This value may also be either a downstream and/or upstream bitrate or some combination of these values as is commonly known to one skilled in the art. The GUI 700 may further contain a "result" field 708 that contains values from the product of the number of capable lines field 704 and the weighting field 706. In one aspect, all of the values in the result field 708 may be summed and inserted in the "total" result field 728.

The values for the technology field 702, number of capable lines field 704, weighting field 706, result field 708, dial-up 710, ADSL 712, ADSL2+ 714, VDSL2 bonding 716, VDSL2 718, FTTN 720, FTTC 722, and FTTP 724 may be stored on any of the personal computers 104 and 106, storage units 116, and/or databases 118 and 120, or any other storage means associated with the system for characterizing network capacity 100. Typically, the value for the number of capable lines field 704 is the number of connections, loops, subscribers 204, 206, 208, and 210 that subscribe to a telecommunications service provider 240 that reside in a particular geographic area, such as geographic areas 602, 604, and 606, for example. The values of the weighting field 706 may be generally those values associated with each particular capacity or technology in the technology field 702.

For example, the value of weighting field 706 for dial-up 710 may be approximately 56 Kbps or any other value that may be provided for this type of technology or capacity by a telecommunications service provider 240. The value for weighting field 706 for ADSL 712 may be approximately 12 Mbps or any other value that may be provided for this type of technology or capacity by a telecommunications service provider 240. The value for weighting field 706 for ADSL2+ 714 may be approximately 24 Mbps or any other value that may be provided for this type of technology or capacity by a telecommunications service provider 240. The value for weighting field 706 for VDSL2 bonding 716 AND VDSL2 718 may be approximately 100 Mbps or any other value that may be provided for this type of technology or capacity by a telecommunications service provider 240. The value for weighting field 706 for FTTN 720, FTTC 722, and FTTP 724 may be approximately 15 Mbps or more or any other value that may be provided for this type of technology or capacity by a telecommunications service provider 240.

The system for characterizing network capacity 100 may characterize a network segment or overall capacity or speed in terms of a network or network segment descriptor. This descriptor may be based on the capacity in a particular geographic area or smaller geographic area within a selected geographic area. Referring to FIG. 8, an embodiment of a portion of an illustrative matrix 800 is shown that includes elements that contain "1"s and "0"s that have been generated by the system for characterizing network capacity 100. Matrix 800 may be a table of elements 804 and 808 arranged in a series of columns and rows, for example. The matrix 800 may be any dimension and contain any number of rows and columns that are desired to contain the descriptors for a particular geographic area or smaller portions of a geographic area. In one embodiment, the elements 804 and 808 contain either a "0" or a "1" descriptor, which are a result of whether each particular geographic area or smaller portion of the geographic area has a capacity that is less than a predetermined capacity threshold that may be set by the user of the system for characterizing network capacity 100 or be determined by the system for characterizing network capacity 100. Area 810 is shows fewer elements that contain a "0" and may be less effective to employ upgraded equipment to this area due to the lower concentration of elements containing a "0." Whereas, area 802 may be a more effective area to deploy upgraded equipment due to the higher concentration of the elements containing "0"s.

For example, a threshold of 6 Mbps may be set in the system for characterizing network capacity 100. The system for characterizing network capacity 100 compares the capacity in each geographic area with the threshold and assigns a "1" descriptor where the capacity is equal to or greater than the threshold and assigns a "0" descriptor where the capacity is less than the threshold. These descriptors are then inserted into the matrix 800. Referring to the matrix 800, the element 804 contains a "1" descriptor and the element 808 contains a "0" descriptor. In one embodiment, each element corresponds to a particular area of the selected geographic area, such as geographic areas 602, 604, and 606. The matrix 800 may contain areas where several "1" descriptors are contiguous, adjacent, or near to each other as is noted in area 806 of the matrix 800. Likewise, other areas of the matrix 800 may contain areas where several "0" descriptors are contiguous, adjacent, or near to each other as is noted in area 802 of the matrix 800. In other areas of the matrix 800, a mix of "1" and "0" descriptors may be contiguous to each other.

Referring to FIG. 9, another embodiment of an illustrative matrix 900 is shown that includes elements that contain values that are generated by the system for characterizing network capacity 100 based on the descriptors in matrix 800. The system for characterizing network capacity 100 determines and calculates the values in elements 902, 904, 906, and 910 for example. In one example, the number of "1"s are summed together to find a number "n" that is multiplied by the number of contiguous "1," "m," to establish a value "m*n" for the area. For example, if four elements, such as those found area 806, all contain a "1" descriptor, then a value for an element in the matrix 900 may be "4" times a number, such as "400" to produce the value "1600." It can be readily observed that the score for an area with more contiguous geographic segments would score higher than an area with fewer contiguous segments. Likewise, where two geographic areas are adjacent each other that contain a "1" value, then the system for characterizing network capacity 100 may multiply "2" by a number, such as "400" to produce a value of "800." For other geographic areas that contain a value of "1," but that are surrounded by geographic areas that contain "0"s, then the system for characterizing network capacity 100 may just multiply "1" by a number, such as "400" to produce a value of "400."

In one embodiment, the individual element values may represent a neighborhood block with 12 to 18 houses per block and their corresponding capacity. For example, the area shown as 914 may represent a neighborhood block with FTTC technology that would have a higher capacity or be more highly rated compared with other geographic areas that have only copper twisted pair technology. The area 908 may represent a FTTP weighted as approximately system for characterizing network capacity 100 Mbps per premise, for example.

Referring to FIG. 10, another embodiment of an illustrative matrix 1000 is shown that includes elements that contain values that are generated by the system for characterizing network capacity 100 using a mathematical expression, algorithm, or formula, such as DCT. In one embodiment, DCT is used to transform the values contained in matrix 900 to produce an image into its frequency components as found in matrix 1000. In this embodiment, the matrix 1000 displays the capacity values and may be treated as an image and transformed into an array of frequency values that represent the magnitude and complexity of capacity values across the matrix 1000. In one aspect, the values in the elements of matrix 1000 are referred to as transformed geographic elements 1002, 1004, and 1008, for example. In another aspect, subsequent mathematical expressions, algorithms, or formulas may be applied to the values contained in the matrix 1000 to rank order the geographic areas with respect to the kinds of technologies and where they are applied. Areas with large coefficients or values, such as those shown in area 1006, reflect the kind of transformation that has taken place related to the appearance of higher value technologies and their relative occurrence. In one aspect, there may be no one-to-one correspondence between individual values in matrixes 900 and 1000. Any value in matrix 1000 is based on all of the values in matrix 900 and represents the frequency and magnitude of the values in matrix 900, for example. In one aspect, the matrix 1000 is a graphical representation of the data contained in matrix 900. Every element in matrix system for characterizing network capacity 100 is directly related to the overall characteristics of matrix 900.

The matrix 1000 may represent the overall capacity or capability of an arbitrary communications network in a geographic area using a displayed GUI representation. As described above, the value of each descriptor in matrix 900 is changed using a DCT to determine the matrix 1000 containing values that describe a geographical area, such as geographic areas 602, 604, and 606, in terms of the spatial frequencies and magnitudes of the capacities of the communication network in each area. These descriptors are depicted graphically to the user and can be used to detect where gradients in network capacity occur, for example. The resultant matrix 1000 of values can also be filtered to obtain a compressed view of the network as described more fully below. The filters can also be used as matched filters to indicate specific network situations where network capacity is inadequate or to indicate special conditions that require attention.

In one embodiment, the geographical size of each element in matrixes 800, 900, and 1000 may be any geographic area as desired. In one example, the elements of the matrixes 800, 900, and 1000 may represent a neighborhood containing 50 premises, for example. In another example, each element of the matrixes 800, 900, and 1000 may be a particular city or state, for example. Any geographic size may be used for the calculations of the elements of the matrixes 800, 900, and 1000. In one aspect, the elements of matrixes 800, 900, and 1000 correspond in relation to each other as the actual geographic areas being characterized. In one embodiment, the matrix 1000 represent the totality of the entire selected geographic area, whereas the matrix 900 may be more represented to the totality of the regional capacity on each element representing a geographic area. In one embodiment, the matrix 900 may be more useful in comparing some geographic areas, such as comparing the capacity in Fort Myers, Florida against the capacity for Las Vegas, Nev., for example.

In one embodiment, any of the matrixes 800, 900, and 1000 may be highlighted, colored, or otherwise displayed such that it readily conveys to a user those geographic areas that have high capacity and those geographic areas that have a lower capacity. In addition, any other indicia may be used to convey the same information to a user of the system for characterizing network capacity 100.

In one embodiment, the DCT function enables the system for characterizing network capacity 100 to quickly display those high and low concentrations of premises that may be deficient in capacity to further enable a user of the system for characterizing network capacity 100 to quickly see those areas that it would be cost effective to upgrade capacity equipment and those areas where it would be less cost effective to do so. The DCT aspect of the system for characterizing network capacity 100 provide image calculations and applies them to geographic areas as if they were images of a network.

Figure 11:
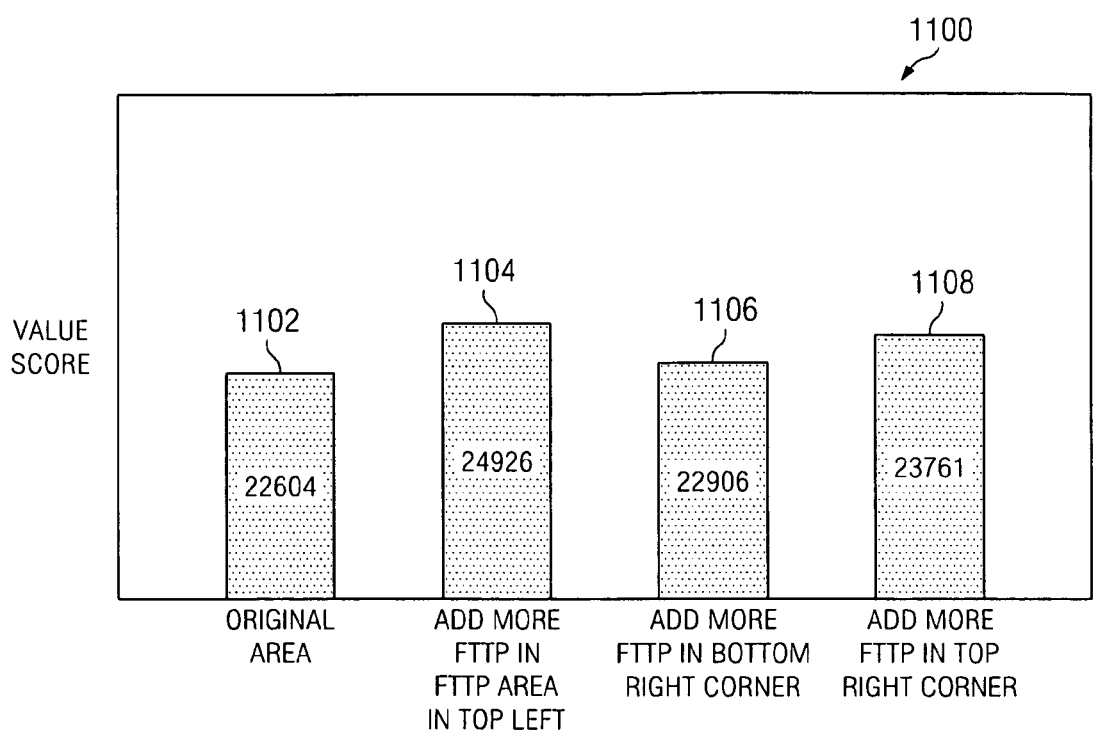
FIG. 11 illustrates a GUI chart display depicting a summation algorithm that is applied by the system for characterizing network capacity according to an embodiment of the present invention.

Referring to FIG. 11, an embodiment of an exemplary GUI chart 1100 is depicted showing a summation algorithm that is applied by the system for characterizing network capacity 100 for providing scenarios to a user relating to changing the technology provided to a geographic area. The GUI chart 1100 details an exemplary four scenarios with different technologies applied to the same geographic area and the relative score for each scenario. A first illustrative scenario 1102 shows an arbitrary geographic area, such as geographic area 606 as shown earlier with a combination of FTTC, FTTP, and copper twisted pair technologies applied to various neighborhood blocks. Using the DCT process, and a summation algorithm, the score for geographic area 606 is shown to be 22604. A second illustrative scenario 1104 is the same geographic area 606 with an additional four block area deployed with FTTP in the upper left corner next to the already deployed FTTP. The score for this second area is 24926. A third illustrative scenario 1106 is the same geographic area 606 deployed with FTTP technology in the bottom right corner of the geographic area. The score for this area is 22906 indicating that the deployment of FTTP isolated from the original deployment in the upper right corner is not as effective in creating a high value area as scenario two. Finally, a fourth illustrative scenario 1108 is the same geographic area that has FTTP deployed in the top right corner of the geographic area and has a score of 23761. This type of deployment is also not as valuable as the deployment of FTTP in close proximity to the original deployment of FTTP.

Figure 12:
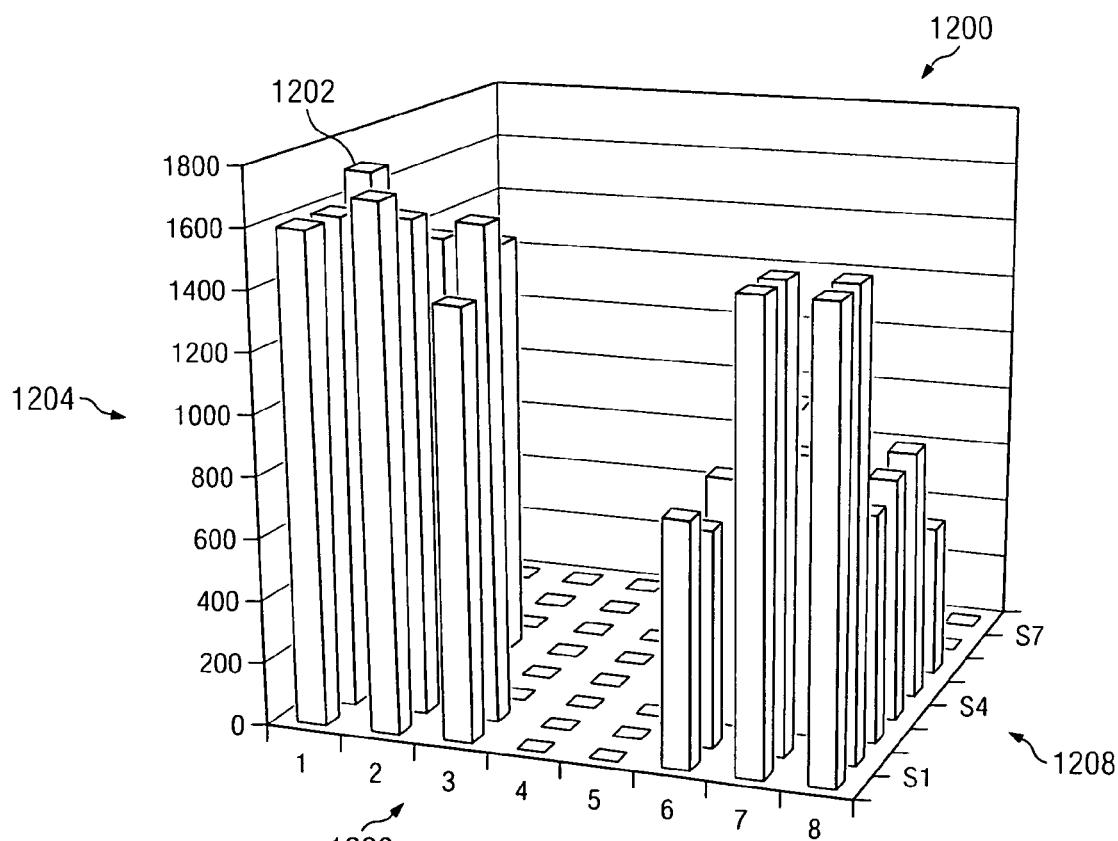
FIG. 12 illustrates a GUI display of a distribution of network values in a three-dimensional representation by the system for characterizing network capacity according to an embodiment of the present invention.

Referring to FIG. 12, an embodiment of a GUI display 1200 is shown depicting a three-dimensional representation of a network area by the system for characterizing network capacity 100. In this embodiment, the GUI display 1200 depicts the values of the matrix 900 as three-dimensional bars. For example, the height of each column 1202 corresponds to the value of an element in the matrix 900. In one aspect, the overall network capacity is shown as the y-axis values 1204. These values may be different magnitudes than those shown according to a particular network being characterized. The x-axis values 1206 correspond to either the rows or columns of matrix 900 and the z-axis values 1208 correspond to the other of the rows or columns of matrix 900.

Figure 13:
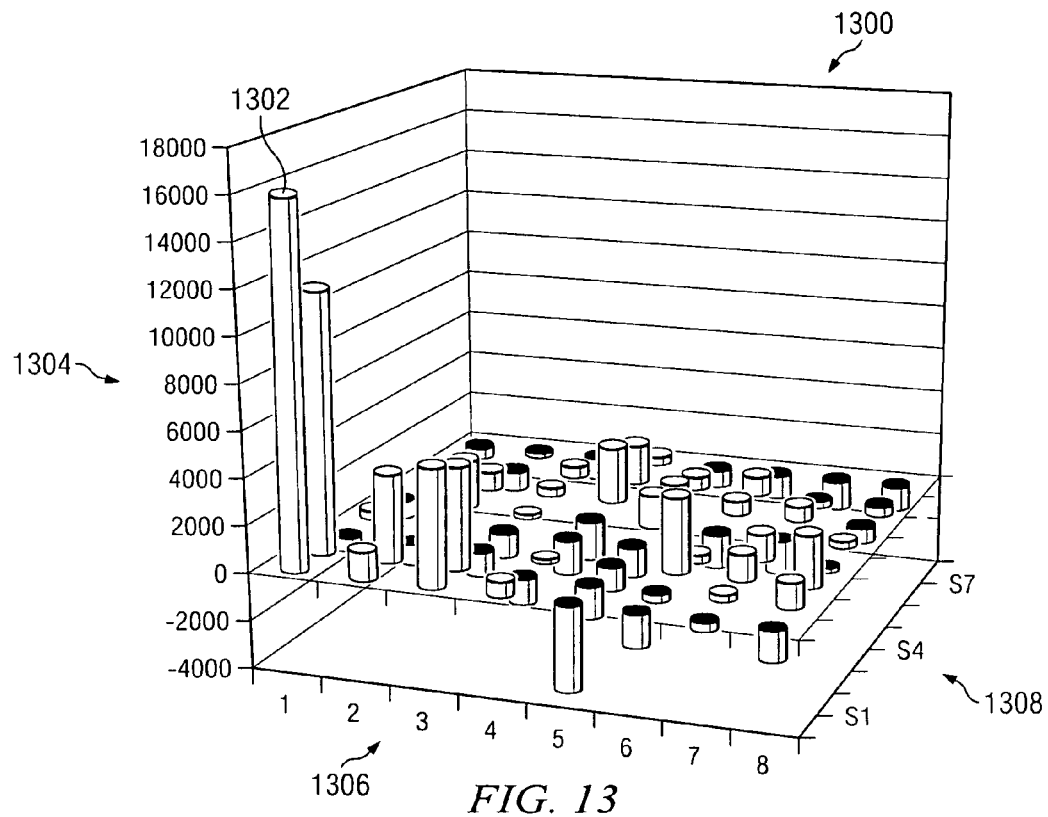
FIG. 13 illustrates a GUI display of a distribution of network values in a three-dimensional representation by the system for characterizing network capacity according to another embodiment of the present invention.

Referring to FIG. 13, an embodiment of a GUI display 1300 is shown depicting a three-dimensional representation of a network area by the system for characterizing network capacity 100. In this embodiment, the GUI display 1300 depicts the values of the matrix 1000 as three-dimensional bars. For example, the height of each column 1302 corresponds to the value of an element in the matrix 1000. In one aspect, the overall network capacity is shown as the y-axis values 1304. These values may be different magnitudes than those shown according to a particular network being characterized. The x-axis values 1306 correspond to either the rows or columns of matrix 900 and the z-axis values 1308 correspond to the other of the rows or columns of matrix 1000.

Figure 14:
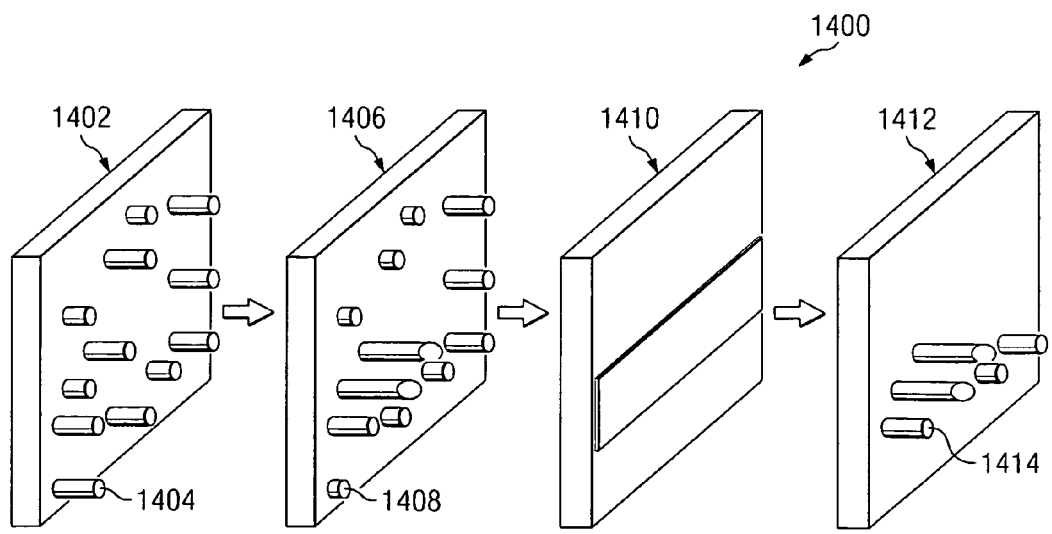
FIG. 14 illustrates a GUI display of a filtered distribution of network values in a three-dimensional representation by the system for characterizing network capacity according to another embodiment of the present invention.

Referring to FIG. 14, an embodiment of a GUI display 1400 is shown depicting a three-dimensional representation of a network area by the system for characterizing network capacity 100. The GUI display 1400 is a representation of any of the matrixes described herein where a filter has been applied to compress or alternate the view of a network area or geographic area. An initial matrix 1402 may be displayed that includes the original values from any of the matrix 900, for example, where the capacity values, such as 1404, are shown relative to each other for a particular network area or geographic area as described herein. The GUI display 1400 may further display a transformed matrix 1406 depicting the transformed values from matrix 1000, for example, where the transformed values, such as 1408, are shown relative to each other for a particular network area or geographic area as described herein. The GUI display 1400 may only display the positive values from their respective matrixes or it may display both the positive and negative values. A filter 1410 may be applied to the matrix 1402 and/or 1406 which will result in a resultant matrix 1412 being displayed to a user of the system for characterizing network capacity 100. The resultant matrix 1412 may only show those capacity values 1414 that meet a desired threshold according to the user or pre-set at the system for characterizing network capacity 100. The resultant matrix 1412 may be used to determine a potential network issue that needs to be corrected.

The present system for characterizing network capacity 100 characterizes to a user, such as a telecommunications service provider, in terms of the capacity of their network and the capacities of their network in particular geographic areas, such as a particular city, municipality, wire center, CSA, or other geographically bound network areas. The present system for characterizing network capacity 100 may be used by the telecommunications service provider to more accurately and realistically describe these areas, such that quicker, less costly and better quality network investments can be made.

The term, "premise" or "premises," means any building, house, dwelling, and the like that is provided telecommunications services. The term, "geographic area," means any area of a particular geographical location, such as a street, a neighborhood, a city, a county, a state, and the like. The size of any geographic area may be determined by the user of the system for characterizing network capacity or it may be predetermined in the software of the present system for characterizing network capacity.

A DCT is a Fourier-related transform similar to the discreet Fourier transform ("DFT"), but using only real numbers. Some exemplary DCT expressions are provided below. In one aspect, the DCT is a linear, invertible function $F:R^N \rightarrow R^N$ (where R denotes the set of real numbers), or equivalently an N×N square matrix, such as matrixes 800, 900, and 1000. Any of the values of the elements of the matrixes 800, 900, and 1000 determined, obtained, stored, and/or generated by the system for characterizing network capacity 100 may be used in the formulas noted below, for example. There may be several variants of the DCT with slightly modified definitions as known to those skilled in the art. The N real numbers $x_0, \ldots, x_{N-1}$ may also be transformed into the N real numbers $X_0, \ldots, X_{N-1}$ according to one of the formulas:

DCT-I $$X_k = \frac{1}{2}(x_0 + (-1)^k x_{N-1}) + \sum_{n=1}^{N-2} x_n \cos\left[\frac{\pi}{N-1} nk\right] \quad (I)$$

$$k = 0, \ldots, N-1.$$

In this formula, the $x_0$ and $x_{N-1}$ items are multiplied by $\sqrt{2}$, and correspondingly multiply the $X_0A$ and $X_{N-1}$ terms by $1\sqrt{2}$. This makes the DCT-1 matrix orthogonal, if the system for characterizing network capacity 100 further multiplies by an overall scale factor of $\sqrt{2}/(N-1)$, but breaks the direct correspondence with a real-even DFT. The DCT-1 is exactly equivalent (up to an overall scale factor of 2), to a DFT of 2N−2 real numbers with even symmetry. For example, a DCT-1 of N=5 real numbers abcde is exactly equivalent to a DFT of eight real numbers abcdedcb (even symmetry), divided by two. (In contrast, DCT types II-IV involve a half-sample shift in the equivalent DFT.) Note, however, that the DCT-1 is not defined for N less than 2. (All other DCT types are defined for any positive N.) Thus, the DCT-1 corresponds to the boundary conditions: $x_n$ is even around n=0 and even around n=N−1; similarly for $X_k$.

DCT-II $$X_k = \sum_{n=0}^{N-1} x_n \cos\left[\frac{\pi}{N}\left(n + \frac{1}{2}\right)k\right] \quad (II)$$

$$k = 0, \ldots, N-1.$$

The DCT-II is probably the most commonly used form, and is often simply referred to as "the DCT". This transform is exactly equivalent (up to an overall scale factor of 2) to a DFT of 4N real inputs of even symmetry where the even-indexed elements are zero. That is, it is half of the DFT of the 4N inputs $y_n$, where $y_{2n}=0$, $y_{2n+1}=x_n$ for 0≤N, and $y_{4N-n}=y_n$ for 0<n<2N. The system for characterizing network capacity 100 may further multiply the $X_0$ term by $1/\sqrt{2}$ (see below for the corresponding change in DCT-III). This makes the DCT-II matrix orthogonal, if the system for characterizing network capacity 100 further multiplies by an overall scale factor of $\sqrt{2}/N$, but breaks the direct correspondence with a real-even DFT of half-shifted input. The DCT-II implies the boundary conditions: $x_n$ is even around n=½ and even around n=N−½; $X_k$ is even around k=0 and odd around k=N.

DCT-III $$X_k = \frac{1}{2}x_0 + \sum_{n=0}^{N-1} x_n \cos\left[\frac{\pi}{N}n\left(k + \frac{1}{2}\right)\right] \quad (III)$$

$$k = 0, \ldots, N-1.$$

Because it is the inverse of DCT-II (up to a scale factor, see below), this form is sometimes simply referred to as "the inverse DCT" ("DCT"). The system for characterizing network capacity 100 may further multiply the x0 term by $\sqrt{2}$ (see above for the corresponding change in DCT-II), so that the DCT-II and DCT-III are transposes of one another. This makes the DCT-III matrix orthogonal, if the system for characterizing network capacity 100 further multiplies by an overall scale factor of √2/N, but breaks the direct correspondence with a real-even DFT of half-shifted input. The DCT-III implies the boundary conditions: $x_n$ is even around n=0 and even around n=N; $X_k$ is even around k=½ and even around k=N-½.

DCT-IV $$X_k = \sum_{n=0}^{N-1} x_n \cos\left[\frac{\pi}{N}\left(n+\frac{1}{2}\right)\left(k+\frac{1}{2}\right)\right] \quad (IV)$$

$$k = 0, \ldots, N-1.$$

The DCT-IV matrix becomes orthogonal if the system for characterizing network capacity 100 further multiplies by an overall scale factor of √2/N. A variant of the DCT-IV, where data from different transforms are overlapped, is called the modified discrete cosine transform (MDCT). The DCT-IV implies the boundary conditions: $x_n$ is even around n=½ and odd around n=N-½; similarly for $X_K$.

DCT-V-VIII

DCT types I-IV are equivalent to real-even DFTs of even order (regardless of whether N is even or odd), since the corresponding DFT is of length 2(N−1)(for DCT-I) or 4N (for DCT-II/III) or 8N (for DCT-VIII). In principle, there are actually four additional types of discrete cosine transform (Mucci, 1994), corresponding essentially to real-even DFTs of logically odd order, which have factors of N±½ in the denominators of the cosine arguments. Equivalently, DCTs of types I-IV imply boundaries that are even/odd around either a data point for both boundaries or halfway between two data points for both boundaries. DCTs of types V-VIII imply boundaries that are even/odd around a data point for one boundary and halfway between the two data points for the other boundary. However, these variants seem to be rarely used in practice. One reason, perhaps, is that FFT algorithms for odd-length DFTs are generally more complicated than FFT algorithms for even-length DFTs (e.g., the simplest radix-2 algorithms are only for even lengths), and this increased intricacy carries over to the DCTs as described below. (The trivial real-even array, a length-one DFT (odd length) of a single number a, corresponds to a DCT-V of length N=1).

Inverse Transforms

The inverse of DCT-I is DCT-I multiplied by 2/(N−1). The inverse of DCT-IV is DCT-IV multiplied by 2/N. The inverse of DCT-II is DCT-III multiplied by 2/N (and vice-versa). Like for the DFT, the normalization factor in front of these transform definitions is merely a convention and differs between treatments. For example, the system for characterizing network capacity 100 may multiply the transforms by √2/N so that the inverse does not require any additional multiplicative factor. Combined with appropriate factors of √2 (see above), this can be used to make the transform matrix orthogonal.

Multidimensional DCTs

Multidimensional variants of the various DCT types follow straightforwardly from the one-dimensional definitions: they are simply a separable product (equivalently, a composition) of DCTs along each dimension. For example, a two-dimensional DCT-II of an image or a matrix is simply the one-dimensional DCT-II, from above, performed along the rows and then along the columns (or vice-versa). That is, the 2d DCT-II is given by the formula (omitting normalization and other scale factors, as above):

$$X_{k_1,k_2} = \sum_{n_1=0}^{N_1-1}\sum_{n_2=0}^{N_2-1} x_{n_1,n_2} \cos\left[\frac{\pi}{N_1}\left(n_1+\frac{1}{2}\right)k_1\right]\cos\left[\frac{\pi}{N_2}\left(n_2+\frac{1}{2}\right)k_2\right].$$

Technically, computing a two- (or multi-) dimensional DCT by sequences of one-dimensional DCTs along each dimension is known as a row column algorithm (after the two=dimensional case). As with multidimensional FFT algorithms, however, there exist other methods to compute the same thing while performing the computations in a different order (i.e., interleaving/combining the algorithms for the different dimensions).

Figure 15:
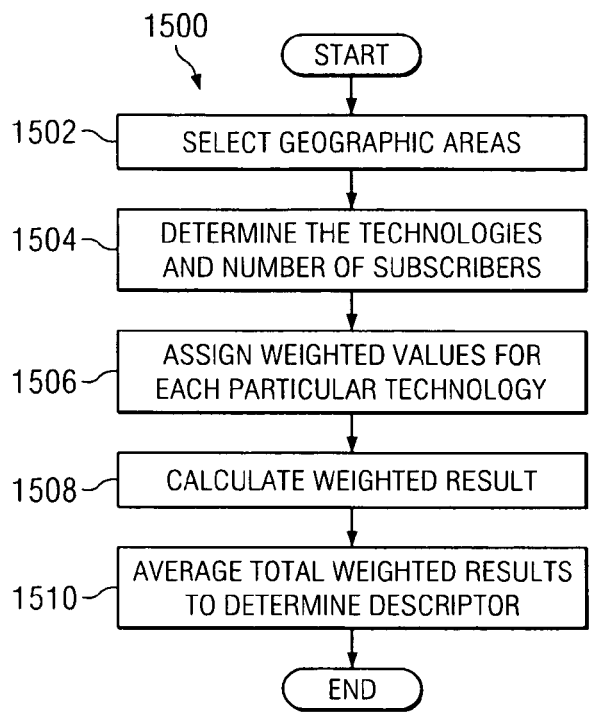
FIG. 15 illustrates a flow chart of an exemplary process for characterizing network capacity according to an embodiment of the present invention.

In addition to the aforementioned aspects and embodiments, the system for characterizing network capacity 100 further includes methods for characterizing the overall capacity of a selected geographic area. FIG. 15 illustrates an embodiment 1500 of a method for characterizing the overall capacity of a selected geographic area. In step 1502, geographic areas are selected from a displayed geographic area, such as geographic area 602. This step may include selecting any geographic areas, sub-parts or geographic areas, or smaller portions of geographic areas as desired by the user of the system for characterizing network capacity 100. In one aspect, the selected geographic area could be a state or a neighborhood depending on the desired output from the system for characterizing network capacity 100.

In step 1504, the number of subscribers and the telecommunications capacity provided to each subscriber are determined. This step may include acquiring subscriber information related to location and capacity provided to each subscriber in that particular location for all subscribers in a particular geographic area.

In step 1506, a weighted value may be assigned to each different capacity provided to that particular geographic location. This step may include assigning weighted values based on whether the capacity is dial-in, DSL, VDSL, FTTN, FTTC, FTTP, and the like as described herein. The weighted value may also known as the weighting field 706, may be a value assigned by a user of the system for characterizing network capacity 100 in accordance with each type of technology employed at each of its subscriber's premises. So for example, if a telecommunications service provider 240 provides FTTP to certain geographic areas, it may assign the capacity or weighted value based on the average bandwidth or speed of its FTTP connections to those premises, such as system for characterizing network capacity 100 Mbps. In another example, if a telecommunications service provider 240 provides dial-up service to its subscribers in a rural area of a selected geographic area, then it may assign an average bandwidth or speed for that connection to those premises as well, such as 56 Kbps. In yet another example, if a telecommunications service provider 240 provides FTTC service to its subscribers in a rural area of a selected geographic area, then it may assign an average bandwidth or speed for that connection to those premises as well, such as 50 ups.

In step 1508, the weightings for each different capacity is multiplied by the number of subscribers to that particular capacity in that particular geographic location to produce a weighted result for each capacity. For example, if a telecommunications service provider 240 has 10,000 subscribers to a particular technology, such as FTTP, then the number of subscribers, 10,000, is multiplied by the weighted value, such as system for characterizing network capacity 100 Mbps to produce a result, such as result field 708 for each different technology in each different geographic area.

In step 1510, the average capacity for that particular geographic area is determined by summing all of the weighted results to produce a total weighted value that is then divided by the number of subscribers in that particular geographic area to produce an average capacity value for that particular geographic area. The average capacity value for each geographic area may be compared to each other to determine those geographic areas that may need upgrading and how effective and how best to deploy such upgrading.

Figure 16:
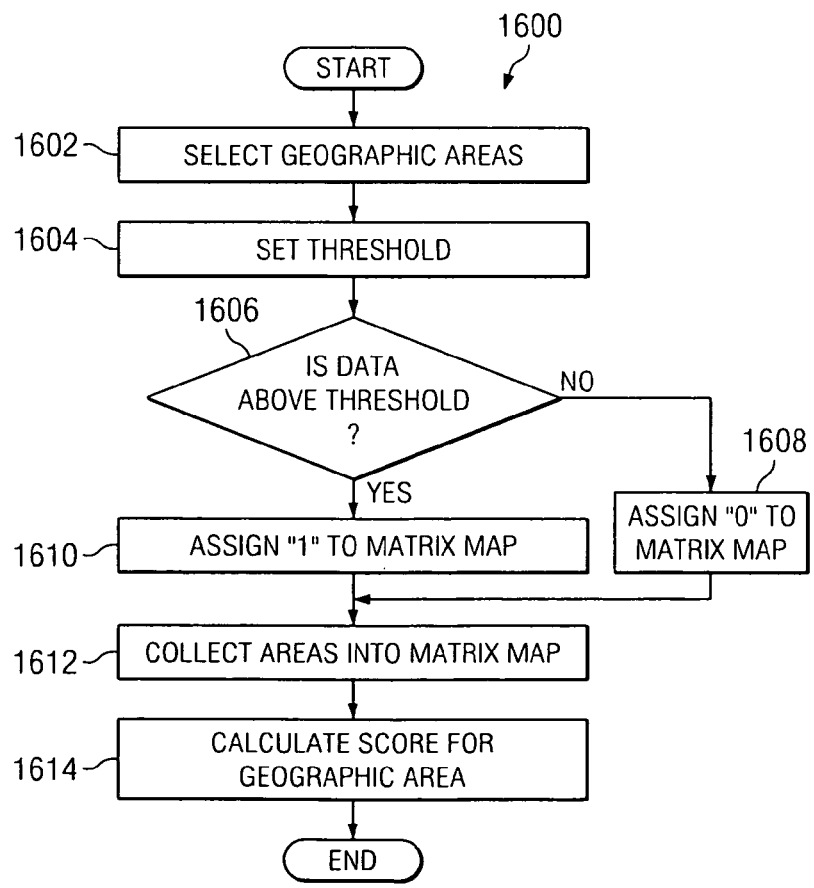
FIG. 16 illustrates a flow chart of an exemplary process for characterizing network capacity according to another embodiment of the present invention.

FIG. 16 illustrates another embodiment 1600 of a method for characterizing the overall capacity of a selected geographic area. In step 1602, geographic areas are selected from a displayed geographic area, such as geographic area 602. In step 1604, a threshold of a desired capacity is set for filtering the capacity results that are displayed or outputted by the system for characterizing network capacity 100. For example, a capacity of 6 Mbps or some other capacity may be selected. In step 1606, the system for characterizing network capacity 100 inquires whether each selected geographic areas or smaller geographic areas within the selected geographic area is above the set threshold. For example, if the threshold was set at 6 Mbps, then the system for characterizing network capacity 100 determines whether each of the selected geographic areas or smaller geographic areas within the selected geographic areas meets the 6 Mps threshold. If each selected geographic areas or smaller geographic areas within the selected geographic areas has a capacity that is less than the threshold, then in step 1608 the system for characterizing network capacity 100 assigns a "0" to that particular geographic area. If each selected geographic areas or smaller geographic areas within the selected geographic areas has a capacity that is equal to or greater than the threshold, then in step 1610 the system for characterizing network capacity 100 assigns a "1" to that particular geographic area. In step 1612, the system for characterizing network capacity 100 inserts the "1"s and "0"s into a matrix. In step 1614, the system for characterizing network capacity 100 calculates a score based on the occurrences and proximities of the descriptors in the matrix 800 for producing values found in matrix 900.

Figure 17:
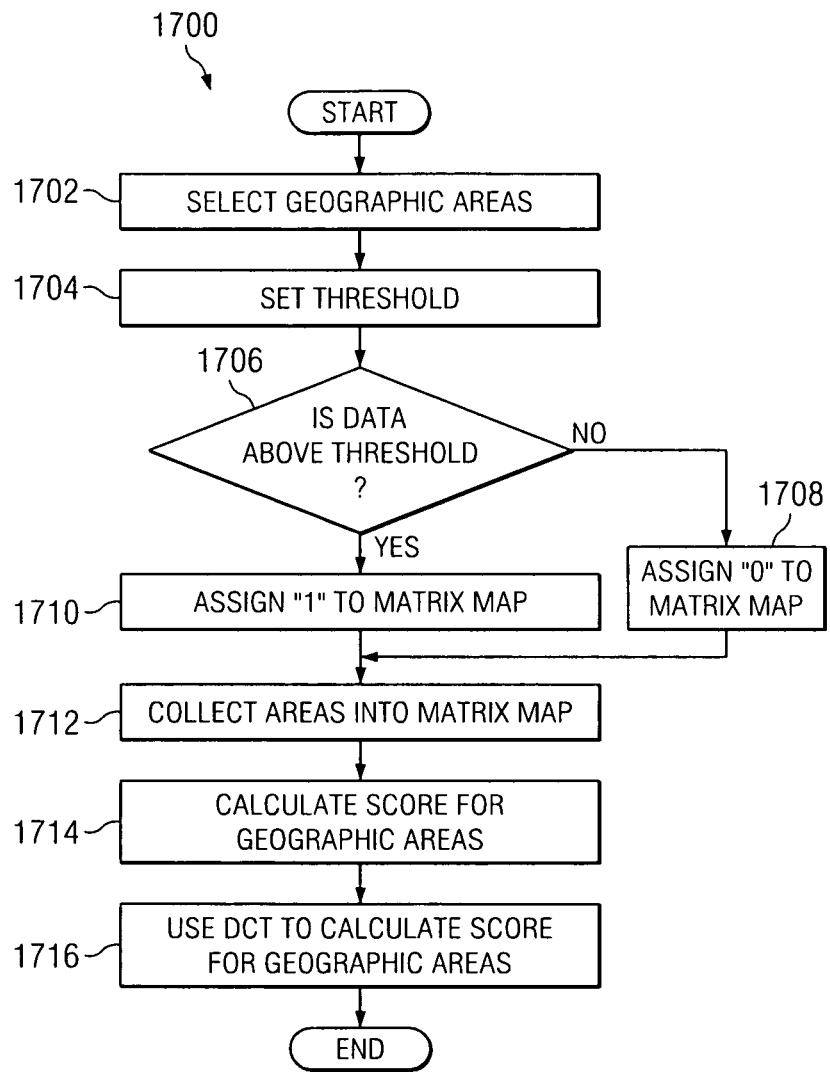
FIG. 17 illustrates a flow chart of an exemplary process for characterizing network capacity according to yet another embodiment of the present invention.

FIG. 17 illustrates yet another embodiment 1700 of a method for characterizing the overall capacity of a selected geographic area. In step 1702, geographic areas are selected from a displayed geographic area, such as geographic area 602. In step 1704, a threshold of a desired capacity is set for filtering the capacity results that are displayed or outputted by the system for characterizing network capacity 100. For example, a capacity of 6 Mbps or some other capacity may be selected. In step 1706, the system for characterizing network capacity 100 inquires whether each selected geographic areas or smaller geographic areas within the selected geographic area is above the set threshold. For example, if the threshold was set at 6 Mbps, then the system for characterizing network capacity 100 determines whether each of the selected geographic areas or smaller geographic areas within the selected geographic areas meets the 6 Mbps threshold. If each selected geographic areas or smaller geographic areas within the selected geographic areas has a capacity that is less than the threshold, then in step 1708 the system for characterizing network capacity 100 assigns a "0", to that particular geographic area. If each selected geographic areas or smaller geographic areas within the selected geographic areas has a capacity that is equal to or greater than the threshold, then in step 1710 the system for characterizing network capacity 100 assigns a "1" to that particular geographic area. In step 1712, the system for characterizing network capacity 100 inserts the "1"s and "0"s into a matrix. In step 1714, the system for characterizing network capacity 100 calculates a score based on the occurrences and proximities of the descriptors in the matrix 800 for producing values found in matrix 900. In step 1716, the system for characterizing network capacity 100 calculates another score based on the values of the matrix 900 using DCT for producing values found in matrix 1000. This step may include summing together these values to calculate the overall capacity descriptor for an overall geographic area, such as geographic areas 602, 604, and 606.

There has been described a system for characterizing network capacity. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, particular additional servers, computers, networks and the like may be used to convey the information categories and related stored documents without departing from the inventive concepts. In addition, other mathematical expressions may be employed without departing from the inventive concepts.

What is claimed:

1. A computer implemented system for characterizing capacity of a telecommunications network comprising:
a server including at least one storage device for storing a plurality of premise addresses for a plurality of subscribers of the telecommunications network and a weighted value for the corresponding capacity of the telecommunications network to each of the plurality of premise addresses, the weighted value for each premise address being calculated based on a type of network access technology that provides the capacity to that premise address;
a display for displaying maps of geographic areas covering the plurality of premise addresses;
an input device for selecting a first geographic area containing one or more of the plurality of premise addresses on the displayed maps of geographic areas; and
a processor configured to:
determine a total number of premise addresses in the selected first geographic area and the weighted value for the corresponding capacity to each of the premise addresses in the selected first geographic area;
calculate an average capacity based on the weighted value for the capacity to the one or more premise addresses in a smaller portion of the selected first geographic area;
produce a first matrix that corresponds to the selected first geographic area, each element of the first matrix representing the smaller portion of the selected first geographic area;
assign a descriptor to each element of the first matrix based on the calculated average capacity for the one or more premise addresses within the smaller portion of the selected first geographic area; and
generate a second matrix comprising a plurality of elements, the plurality of elements including a first element having a descriptor calculated by summing descriptors assigned to a plurality of elements of the first matrix, which represent a number of areas in the smaller portion of the selected first geographic area having a capacity equal to or greater than a threshold value, and multiplying the summed descriptors by a number of contiguous smaller portions of the selected first geographic area having a capacity equal to or greater than the threshold value.

2. The computer implemented system for characterizing capacity of a telecommunications network of claim 1 wherein the processor is further configured to generate a third matrix, wherein elements of third matrix are generated by applying a Discrete Cosine Transform (DCT) algorithm to the elements in the second matrix, the third matrix providing information regarding the selected first geographic area in terms of the spatial frequencies and magnitudes of the capacities of the communication network in each of the smaller portion of the selected first geographic area.

3. The system of claim 2, wherein the processor is further configured to calculate a score for each of the smaller portion of the selected first geographic area using the DCT values in the third matrix.

4. The system of claim 2, wherein the processor is further configured to display a three-dimensional indicia corresponding in magnitude to each of the elements of the third matrix.

5. The computer implemented system for characterizing capacity of a telecommunications network of claim 1 wherein the telecommunications network is selected from the group consisting of public switched telephone network services, voice over Internet Protocol services, broadband telecommunications services, narrowband telecommunications services, integrated services digital network services, digital subscriber line services, cable services, analog telephone services, digital telephone services, private branch exchange services, fiber to the node services, fiber to the premises, asymmetric digital subscriber line services, hybrid fiber coaxial, and very high digital subscriber line services.

6. The computer implemented system for characterizing capacity of a telecommunications network of claim 5 wherein the weighted value for the corresponding capacity for at least one subscriber is an average bandwidth associated with the telecommunications network.

7. The system of claim 1, wherein the processor is further configured to select a capacity threshold for the at least one premise address in the smaller portion of the selected first geographic area.

8. The system of claim 7, wherein the processor is further configured to assign a first descriptor to each element of the first matrix when the calculated average capacity is less than the capacity threshold and a second descriptor to each element of the first matrix when the calculated average capacity is equal to or greater than the capacity threshold.

9. The system of claim 1, wherein each of the descriptors in the first matrix is one of a "1" or a "0."

10. A method for characterizing capacity of a telecommunications network comprising:
storing a plurality of premise addresses for a plurality of subscribers of the telecommunications network and a weighted value for the corresponding capacity of the telecommunications network to each of the plurality of premise addresses, the weighted value for each premise address being calculated based on a type of network access technology that provides the capacity to that premise address;
displaying maps of geographic areas covering the plurality of premise addresses;
receiving a selection of a first geographic area containing one or more of plurality of premise addresses on the displayed maps of geographic areas;
determining a total number of premise addresses in the selected first geographic area and the weighted value for the corresponding capacity to each of premise addresses in the selected first geographic area;
calculating an average capacity based on the weighted value for the capacity to the one or more premise addresses a smaller portion of the selected first geographic area;
producing a first matrix that corresponds to the selected first geographic area, each element of the first matrix representing the smaller portion of the selected first geographic area;
assigning a descriptor to each element of the first matrix based on the calculated average capacity for the one or more premise addresses within the smaller portion of the selected first geographic area; and
generating a second matrix comprising a plurality of elements, the plurality of elements including a first element having a descriptor calculated by summing descriptors assigned to a plurality of elements of the first matrix, which represent a number of areas in the smaller portion of the selected first geographic area having a capacity equal to or greater than a threshold value, and multiplying the summed descriptors by a number of contiguous smaller portions of the selected first geographic area having a capacity equal to or greater than the threshold value.

11. The method for characterizing capacity of a telecommunications network of claim 10 further comprising:
selecting a capacity threshold for the at least one premise address in the smaller portion of the selected first geographic area.

12. The method for characterizing capacity of a telecommunications network of claim 11 wherein the assigning a descriptor further comprises:
assigning a first descriptor to each element of the first matrix when the calculated average capacity is less than the capacity threshold and a second descriptor to each element of the first matrix when the calculated average capacity is equal to or greater than the capacity threshold.

13. The method for characterizing capacity of a telecommunications network of claim 10 wherein each of the descriptors in the first matrix is one of a "1" or a "0."

14. The method for characterizing capacity of a telecommunications network of claim 10 further comprising:
generating a third matrix, wherein elements of third matrix are generated by applying a Discrete Cosine Transform (DCT) algorithm to the elements in the second matrix, the third matrix providing information regarding the selected first geographic area in terms of the spatial frequencies and magnitudes of the capacities of the communication network in each of the smaller portion of the selected first geographic area.

15. The method for characterizing capacity of a telecommunications network of claim 14 further comprising:
calculating a score for each of the smaller portion of the selected first geographic area using the DCT values in the third matrix.

16. The method for characterizing capacity of a telecommunications network of claim 14 further comprising:
displaying a three-dimensional indicia corresponding in magnitude to each of the elements of the third matrix.

17. The method of claim 10, wherein the telecommunications network is selected from the group consisting of public switched telephone network services, voice over Internet Protocol services, broadband telecommunications services, narrowband telecommunications services, integrated services digital network services, digital subscriber line services, cable services, analog telephone services, digital telephone services, private branch exchange services, fiber to the node services, fiber to the premises, asymmetric digital subscriber line services, hybrid fiber coaxial, and very high digital subscriber line services.

18. The method of claim 10, wherein the weighted value for the corresponding capacity for at least one subscriber is an average bandwidth associated with the telecommunications network.

* * * * *